United States Patent

McNamee et al.

[15] 3,671,472

[45] June 20, 1972

[54] MINERAL-COATING COMPOSITIONS COMPRISING AN AMINE POLYMER AND AN AMYLACEOUS SUBSTANCE AND PAPERS COATED THEREWITH

[72] Inventors: Raymond W. McNamee, Horsham; Lubomir Mlynar, Hatboro; Norman Schachat, Levittown, all of Pa.

[73] Assignee: Rohm and Haas Company, Philadelphia, Pa.

[22] Filed: Oct. 7, 1968

[21] Appl. No.: 765,619

[52] U.S. Cl..................260/17.4 ST, 117/155 UA, 117/156, 117/161 C, 117/165, 162/168, 162/181 D, 260/8
[51] Int. Cl........................................C08f 45/06, C08f 45/18
[58] Field of Search............................................260/17.4 ST

[56] References Cited

UNITED STATES PATENTS

| | | | |
|---|---|---|---|
| 2,885,374 | 5/1959 | Sweeney | 260/17.4 |
| 2,893,977 | 7/1959 | Suen et al. | 260/17.4 |
| 3,037,006 | 5/1962 | Hankins et al. | 260/80.5 |
| 3,037,969 | 6/1962 | Hankins et al. | 260/89.5 |
| 3,419,507 | 12/1968 | Brown | 260/8 |
| 3,395,072 | 7/1968 | Talet et al. | 260/17.4 ST |
| 3,409,568 | 11/1968 | Holladay et al. | 260/17.4 ST |
| 3,549,568 | 12/1970 | Coscia et al. | 260/17.4 ST |

OTHER PUBLICATIONS

R. W. Kerr, Chemistry and Industry of Starch, 2nd Ed., Academic Press Inc., N.Y., (1950), pp. 494– 5.

*Primary Examiner*—Howard E. Schain
*Attorney*—Carl A. Castellan and George W. F. Simmons

[57] ABSTRACT

Mineral coating compositions for coating papers in which the binder comprises an amine-containing copolymer and an amylaceous substance. Improvement in wet rub resistance is obtained.

15 Claims, No Drawings

MINERAL-COATING COMPOSITIONS COMPRISING AN AMINE POLYMER AND AN AMYLACEOUS SUBSTANCE AND PAPERS COATED THEREWITH

An amylaceous material, such as starch, is widely used as a pigment binder for paper coatings. The starch is inexpensive, readily available, and imparts good flow properties to the coating system. However, starch has poor water resistance, and this drawback is apparent whenever packages are handled in a moist condition, or when paper is printed by the offset process.

When starch is used in combination with any of the presently available latices, water resistance is sharply reduced as the starch level becomes significant (the exact level that can be tolerated depends on the latex type and the latex level). At present, when good water resistance is needed, the binder used is either a latex per se or a latex/protein, such as a latex/casein, insolubilized with a polyvalent metal or formaldehyde or some formaldehyde derivative such as a urea/formaldehyde or melamine/formaldehyde condensate.

Waterproofing starch by additives (usually crosslinkers) requires elaborate formulation conditions or special cures or both. Modified starches give some improvement in water resistance but require unusual procedures and cause formulation problems such as high viscosity and poor coating color stability.

The latices containing the monomers described in the following section produce excellent water resistance, as measured by wet rub resistance, when used as cobinders with amylaceous substances, in pigmented paper coatings. The excellent water resistance is attained under normal formulation conditions and without special cures. Coating formulations using these latices blended with amylaceous substances exhibit good flow properties and stability. The water resistance is obtained on drying and is probably due to the amine functionality acting on the clay pigment. This latex/clay interaction prevents water from swelling the amylaceous binder substances and maintains a strong coating even when wet. The monomers can be incorporated in a variety of backbones thus allowing a substantial range of hardness and hydrophobicity.

The polymers which serve as binders in the mineral coating of paper in accordance with the present invention comprise nitrogen-containing monomers which contain an amine group, preferably a basic primary or secondary amine group, although tertiary amine groups are also operative. The most effective of the primary and secondary amines are those whose substituents on the amino nitrogen atom do not sterically hinder the reactivity of the nitrogen atom or atoms attached thereto. The polymer may be one which does not initially contain such amine group but is hydrolyzed in an aqueous environment to introduce such a group.

The polymers used as binders in the present invention may contain at least about 1 percent and up to 30 percent or more by weight of the basic primary or secondary amine-containing units. Preferably they contain 3 percent to 12 percent by weight of such units.

A wide variety of amine-containing monomers, or monomers hydrolyzable to produce amine-containing monomers, can be used to form suitable binder polymers by emulsion polymerization. The following list of monomers represents typical categories or classes that are useful.

1. Aminoalkyl vinyl ethers or sulfides wherein the alkyl groups may be straight-chain or branched-chain type and have from two to 18 carbon atoms and wherein the nitrogen atom may be a primary, secondary, or tertiary nitrogen atom (U.S. Pat. No. 3,879,178). In the latter instance, one of the remaining hydrogen atoms may be substituted by alkyl, hydroxyalkyl, or alkoxyalkyl groups, the alkyl components of which may have one to four carbon atoms. Specific examples include:
   β-aminoethyl vinyl ether
   β-aminoethyl vinyl sulfide
   N-monomethyl-β-aminoethyl vinyl ether or sulfide
   N-monethyl-β-aminoethyl vinyl ether or sulfide
   N-monobutyl-β-aminoethyl vinyl ether or sulfide
   N-monomethyl-5-aminopentyl vinyl ether or sulfide 2. Acrylamide or acrylic esters, such as those of the formula II

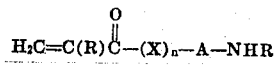

wherein R is H or $CH_3$,
   $n$ is 0 or 1,
   X is —O— or —N(H),
   A, when n is zero, is —O($CH_2$)$_x$— wherein $x$ is 2 to 10, or -(O-alkylene)$_y$ wherein (-O-alkylene)$_y$ is a poly(oxyalkylene) group, having a molecular weight in the range from 88 to 348, in which the individual alkylene radicals are the same or different and are either ethylene or propylene, and
   A, when $n$ is 1, is an alkylene group having two to 10 carbon atoms, and
   R° is H, phenyl, benzyl, methylbenzyl, cyclohexyl, or ($C_1$–$C_6$)alkyl.

Examples of compounds of formula II include:
β-aminoethyl acrylate or methacrylate
N-β-aminoethyl acrylamide or methacrylamide
N-(monomethylaminoethyl)-acrylamide or methacrylamide
N-(mono-n-butyl)-4-aminobutyl acrylate or methacrylate
methacryloxyethoxyethylamine
acryloxypropoxypropoxypropylamine 3. N-acryloxyalkyl-oxazolidines and N-acryloxyalkyl-tetrahydro-1,3-oxazines and the corresponding compounds in which the "alkyl" linkage is replaced by alkoxyalkyl and poly(alkoxy-alkyl), such as those having the formula III:

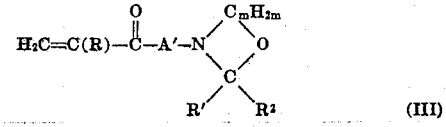

wherein
   $m$ is an integer having a value of 2 to 3,
   R', when not directly joined to $R^2$, is selected from the group consisting of hydrogen, phenyl, benzyl, and ($C_1$–$C_{12}$)alkyl groups,
   $R^2$, when not directly joined to R', is selected from the group consisting of hydrogen and ($C_1$—$C_4$)alkyl groups,
   R' and $R^2$, when directly joined together, form a 5- to 6-carbon ring with the attached carbon atom of the ring in the formula, i.e., R' and $R^2$, when joined together, are selected from the group consisting of pentamethylene and tetramethylene, and
   A' is —O($C_mH_{2m}$)—or (O-alkylene)$_n$ in which (O-alkylene)$_n$ is a poly(oxyalkylene) group, having a molecular weight in the range from 88 to 348, in which the individual alkylene radicals are the same or different and are either ethylene or propylene.

The compounds of formula III can hydrolyze under various conditions to secondary amines. The hydrolysis produces products having the formula IV:

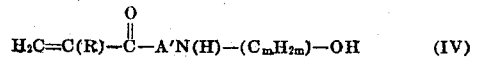

The compounds of formula III are disclosed in U.S. Pat. No. 3,037,006 and Ser. No. 532,015, filed Jan. 6, 1966, now U.S. Pat. No. 3,502,627 in the hands of a common assignee, and their corresponding foreign applications and patents and any of the monomeric compounds disclosed therein may be used in making the copolymers to be used in the mineral coating compositions of the present invention.

Examples of compounds of formula III include:
Oxazolidinylethyl methacrylate
Oxazolidinylethyl acrylate
3-(gamma-methacryloxypropyl)-tetrahydro-1,3-oxazine
3-(β-methacryloxyethyl)-2,2-pentamethyleneoxazolidine
3-(β-methacryloxyethyl)-2-methyl-2-propyloxazolidine
N-2-(2-acryloxyethoxy)ethyl-oxazolidine N-2-(2-methacryloxyethoxy)ethyloxazolidine
N-2-(2-methacryloxyethoxy)ethyl-5-methyl-oxazolidine
N-2-(2-acryloxyethoxy)ethyl-5-methyl-oxazolidine
3-[2-(2-methacryloxyethoxy)ethyl)]-2,2-pentamethylene-oxazolidine
3-[2-(2-methacryloxyethoxy)ethyl)]-2,2-dimethyl-oxazolidine
3-[2-(methacryloxyethoxy)ethyl)]-2-phenyl-oxazolidine 4. Acryloxy-ketimines and -aldimines, such as those of formulas V and VI following:

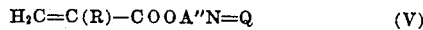

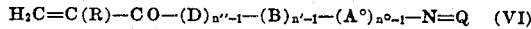

wherein
R is H or $CH_3$,
Q is selected from the group consisting of

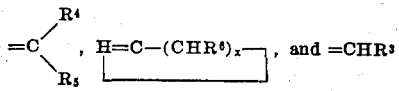

$R^6$ is H or it may be methyl in one $CHR^6$ unit,
$R^4$ is selected from the group consisting of $C_{(1}-C_{12})$-alkyl and cyclohexyl groups,
$R^5$ is selected from the group consisting of $C_{(1}-C_{12})$-alkyl and cyclohexyl groups,
$R^3$ is selected from the group consisting of phenyl, halophenyl, $(C_1-C_{12})$alkyl, cyclohexyl, and $(C_1-C_4)$alkoxyphenyl groups,
$A''$ is a $C_{(2}-C_{12})$ alkylene group,
$A°$, B and D are the same or different oxyalkylene groups having the formula $-OCH(R^7)-CH(R^7)-$ wherein $R^7$ is H, $CH_3$, or $C_2H_5$,
$x$ is an integer having a value of 4 to 5,
$n°$ is an integer having a value of 1 to 200,
$n'$ is an integer having a value of 1 to 200, and
$n''$ is an integer having a value of 1 to 200, the sum of $n°-1$, $n'-1$ and $n''-1$ having a value of 2 to 200.

Illustrative compounds of formulas V and VI are:
2-[4-(2,6-dimethylheptylidene)-amino]-ethyl methacrylate
3-(2-(4-methylpentylidine)-amino)-propyl methacrylate
β-(benzylideneamino)-ethyl methacrylate
3-(2-(4-methylpentylidene)-amino)-ethyl methacrylate
2-[4-(2,6-dimethylheptylidene)-amino]-ethyl acrylate
12-(cyclopentylidene-amino)-dodecyl methacrylate
N-(1,3-dimethylbutylidene)-2-(2-methacryloxyethoxy)-ethylamine
N-(benzylidene)-methacryloxyethoxyethylamine
N-(1,3-dimethylbutylidene)-2-(2-acryloxyethoxy)ethylamine
N-(benzylidene)-2-(2-acryloxyethoxy)ethylamine The compounds of formulas V and VI hydrolyze in acid, neutral, or alkaline aqueous media to produce salts of the corresponding primary amines in which the group $-N=Q$ of the formulas becomes $-NH_2$. The compounds of formulas V and VI are disclosed in U.S. Pat. No. 3,037,969 and copending application Ser. No. 485,591 filed Sept. 7, 1965 (now U.S. Pat. No. 3,497,485) and any of the monomeric compounds therein disclosed may be used in the making of the copolymers to be used in the mineral-coating compositions of the present invention.

The monomers hereinabove are polymerized in an emulsion system under acid, neutral or basic conditions so that the monomers may be used in base form or in their salt form, such as may be obtained with any suitable acid including hydrochloric, sulfuric, sodium bisulfate, phosphoric acid, sodium bioxalate, formic acid, and so on. The emulsion polymerization, for example, may be essentially that illustrated by Procedure 14) of Ser. No. 485,591 supra.

A wide variety of unsaturated comonomers may be copolymerized with the nitrogen-containing monomers mentioned hereinabove. The nitrogen-containing monomers of formulas III, V, and VI may be copolymerized before, during or after hydrolysis to the amine-containing form. Examples of the comonomers include acrylic acid esters and methacrylic acid esters with alcohols having one to 18 carbon atoms, especially $(C_1-C_4)$ alkanols; styrene, vinyltoluene, vinyl acetate, vinyl chloride, vinylidene chloride, substituted styrenes, butadiene, substituted butadienes, ethylene; the nitriles and amides of acrylic or of methacrylic acid; acids such as acrylic acid, methacrylic acid, itaconic acid, and the monoalkyl esters of itaconic acid, such as monomethyl itaconate or monoethyl itaconate.

While the copolymers may have apparent second order transition temperatures as high as 85° C. when the coated papers are to be used with high-temperature calenders, the several monomers are frequently selected so that the resulting polymer has an apparent second order transition temperature (referred to herein as $T_i$) which is not above 45° C. and is preferably 30° C. or below. Thus the amount of hardening monomers, such as methyl methacrylate, styrene, vinyltoluene, and vinyl chloride should be controlled to assure the $T_i$ value is within the limit specified.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The amylaceous material that may be used may be starch itself or solubilized starches, such as starch that is enzyme(zymase)-converted, starches degraded by heat, oxidation and/or by treatment with chlorine bleaches, ethylene oxide derivatives of starches, dextrinized starches, etc. The starch may be derived from corn, potato, tapioca, wheat, or other vegetable source.

The proportion of the amino-polymer may range from about 20 percent to 70 percent or more of the total of the amino-polymer and amylaceous material. Besides the amino-polymer and amylaceous substance, the binder may also contain additional binder materials, such as other vinyl addition emulsion polymers, water-soluble salts of acid copolymers which become water-insoluble when in acid form, glue, gelatine, albumin, aminoplasts, such as urea/formaldehyde or melamine/formaldehyde resin-forming condensates, proteinaceous materials, such as casein and alpha protein, water-soluble or -dispersible linear polyester resins or cellulose ethers or esters, e.g. hydroxyethyl cellulose, carboxymethyl cellulose, and so on. This additional material is, of course, unnecessary to provide the properties desired and normally should not exceed in amount the amount of amino-polymer herein used and is preferably less than 30 percent thereof by weight.

The amount of the binder in such coatings is from 8 percent to 25 percent by weight of the pigment, and is preferably 12 percent to 20 percent by weight thereof.

The pigments that may be employed include a variety of clays, such as bentonite and montmorillite, and especially of the kaolin type. Calcium carbonate, blanc fixe, talc, titanium dioxide, colored lakes and toners, carbon black, graphite, aluminum powder or flakes, and various colored pigments may be used but a clay type pigment is necessary to obtain the most efficient amine-pigment interaction and water resistance. The other pigments mentioned may be used but are preferably used in admixture with a clay-type pigment to assure that good water-resistance is obtained in the coated articles. The term "mineral" in the claims is intended to cover all such types of pigmentary matter whether of strictly mineral character or partly of organic material.

The pigment or pigments are preferably mixed and dispersed in a small amount of water before mixing with the copolymer dispersion. When clay is used as a part of the pigment, and in preferred embodiments, it forms a predominant proportion of the pigment, the dispersion is preferably adjusted to a pH of 8.5 to 9.5 to obtain the optimum dispersion of the clay.

After combining the pigment and copolymer dispersions, the resulting coating composition is applied to the paper or paperboard. It may be applied at any concentration, but ordinarily it is applied at a total solids concentration of at least 30 percent and preferably 35 percent to 70 percent by any suitable equipment, such as immersion roll and doctor system, gravure roller system, brush coater, or spray coater. It may be applied to the paper after drying, and/or conditioning. Alternatively it may be applied during the first drying operation on the paper where it has undergone only partial drying. For example, the coating system may be mounted at an intermediate point in the drier on the paper-making machine, such as at a point where the paper has been reduced to approximately 50 percent moisture content.

After the coating operation, the coated sheet is dried and may then be calendered, and subsequently printed. The drying may be the usual type provided in which air at about 230° to 260° F. (110° to 130° C.) is directed against the paper for 30 to 45 seconds. The paper and coating may reach a temperature of about 180° F. (ca. 85° C.) during the drying operation. Printing may be effected by the conventional inks of precipitation type or heat setting type including those based on drying oils. The coated products of the present invention are receptive to single color inks and multi-color inks of graded viscosity and are able to withstand the pull of such inks. They may be overcoated, after printing, with wax, lacquer, or other compositions.

To assist those skilled in the art to practice the present invention, the following modes of operation are suggested by way of illustration, parts and percentages being by weight and the temperature in °C. unless otherwise specifically noted.

In the wet-rub test used in the examples, the coated paper to be tested is lapped over a piece of glossy black paper so that a substantial area of the black paper is exposed and extends beyond the edge of the coated paper to be tested and a drop of water is applied to the coating to be tested.

The "wet rub resistance" is determined as follows. The index finger of the operator is drawn from the wet spot on the coating and onto the black paper with medium pressure, and the procedure is repeated five times. The water on the black paper is allowed to evaporate and the reflection of light from the spot thereof to which any pigment is transferred from the coated sheet by the finger is measured. The higher the reflection of light, the poorer is the wet-rub resistance.

1 a. One hundred parts of fine coating clay (kaolin) and 0.2 part of sodium hexametaphosphate are mixed in 48 parts of water, and 0.2 percent (on the weight of clay) of ammonium hydroxide is added to adjust the pH to 9.

Corn starch (500 parts) is rendered more soluble by dissolving in 1113 parts of deionized water to which 0.7 part of a zymase (Rhozyme DX of the Rohm and Haas Company) is added. The solution is heated to 170° F., held at that temperature 30 minutes, heated to 205° F. and then held there 15 minutes to deactivate the enzyme. Twenty-six parts of the resulting solubilized starch solution (31 percent concentration) are mixed into the clay suspension. Then there is added 16 parts of an aqueous dispersion of a copolymer having a $T_i$ of about −5° to −10° C, obtained by the emulsion copolymerization of a mixture of 97 parts of ethyl acrylate and 3 parts of N-(benzylidene)-methacryloxyethoxyethylamine in about 106 parts of water in the presence of 6 parts of a t-octylphenoxypolyethoxyethanol containing about 30 oxyethylene units and, as a catalyst, small amounts of ammonium persulfate and sodium hydrosulfite; after polymerization the composition has a pH of 7. The resulting starch/polymer/clay dispersion is adjusted to a concentration of 55 percent and a pH of 9 with ammonia and water.

A dry bond paper is then coated with the composition (which contained 8 percent of copolymer and 8 percent of starch on the weight of pigment) by means of a No. 8 wire-wound rod. About 3 pounds of the coating composition (dry weight) per 1,000 sq. feet of the paper is thus applied to one surface.

The paper is dried at 180° F. for one minute, conditioned overnight at 73° F. and 50% R. H. then calendered three nips at 1,200 pounds/linear inch and 80° F.

b. An analogous composition is prepared in the same fashion as described in part (a) hereof except that the copolymer is replaced by a corresponding amount (8 parts per hundred parts of pigment) of a commercial synthetic latex containing a copolymer of about 40 percent butadiene, 57 percent styrene and 3 percent acrylic acid. This composition is applied to paper in the same way as described in part (a) hereinabove.

c. Six days after the coating, the papers are subjected to the wet rub test described hereinbefore. The brightness of the black surface on to which the coating material removed is collected is measured on a reflectometer with a blue filter.

The results are as tabulated:

| Polymer in Binder | Brightness Reading |
| --- | --- |
| That in part a | 8 |
| That in part b | 28 |

The brightness reading of the black surface is 4.

2. The procedure of (1a) is repeated except that the pigment is replaced with 80 parts of fine coating clay and 20 parts of titanium dioxide. The wet rub resistance test shows similar good resistance to water.

3. Procedure (1) is repeated except that the emulsion copolymer is replaced by a copolymer of 97 percent ethyl acrylate and 3 percent of methacryloxyethoxyethylamine trihydrogen phosphate of the formula

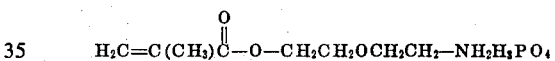

The wet rub resistance of the coating thus obtained in tested 24 hours after coating and another test is made of the paper prepared in procedure (1b) 24 hours after coating. The results are as follows:

| Polymer in Binder | Brightness Reading |
| --- | --- |
| Polymer of 3 | 16 |
| Polymer of 1b | 33 |

When the wet rub test is carried out 6 days after the coating, the results are as follows:

| Polymer in Binder | Brightness Reading |
| --- | --- |
| Polymer of 3 | 10 |
| Polymer of 1b | 22 |

4. Procedure (1) is repeated except that the polymer is replaced by a corresponding amount (8 parts per hundred parts of clay) of each of the following copolymers:

A. A copolymer of 97 percent ethyl acrylate with 3 percent N-(benzylidene)-methacryloxyethoxyethylamine.

B. A copolymer of 48.5 percent ethyl acrylate, 48.5 methyl acrylate and 3 percent N-(benzylidene)-methacryloxyethoxyethylamine.

C. A copolymer of 97 percent methyl acrylate with 3 percent N-(benzylidene)-methacryloxyethoxyethylamine.

A paper is also prepared from each of the resulting coating compositions in accordance with the procedure in (1a).

The various papers are subjected to wet rub resistance tests 24 hours after coating with the following results:

| Polymer in Binder | Brightness Reading |
| --- | --- |

| | |
|---|---|
| A. | 8 |
| B. | 6 |
| C. | 8 |
| Polymer in 1b | 41 |
| D | 92 |
| E | 95 |
| F | 95 |
| Butadiene/styrene/acid polymer of 5 above | 10 |

5. Five different emulsion polymer latices are prepared having the following compositions:

A. 55 percent butyl acrylate/42 percent styrene/3 percent methacryloxyethoxyethylamine hydrogen acetate.

B. 60 percent butyl acrylate/37 percent methylmethacrylate/3 percent methacryloxyethoxyethylamine hydrogen acetate.

C. 97 percent ethyl acrylate/3 percent methacryloxyethoxythylamine trihydrogen phosphate.

D. 64 percent ethyl acrylate/30 percent methyl acrylate/6 percent N-(benzylidene)methacryloxyethoxyethlamine.

E. 97 percent ethyl acryltate/3 percent methacryloxyethoxyethylamine.

Each of the synthetic polymer latices are formulated in a paper coating system as in procedure (1) except the amount of the latex polymer is increased by 50 percent and the amount of starch is reduced by 25 percent so that there are 12 parts of polymer and 6 parts of starch per hundred parts of clay.

Another coating formulation is prepared in which there are 6 parts of starch and 12 parts of a latex polymer per hundred parts of clay except that the latex polymer is another commercially available copolymer of 40 percent butadiene, 57 percent styrene and about 3 percent acrylic acid.

Papers are coated as in procedure (1) and the water resistance is measured by the following method.

A 2 × 3 coated paper, 24 hours after coating, is soaked in 25 ml distilled water for 60 seconds. The paper is then rubbed with the opertor's finger, immersed in water, 40 strokes and the sample removed. The water is then measured for turbidity at 600 $\mu$ using a spectrophotomer. The instrument is adjusted to give 100 percent transmittance for distilled water and 0 percent transmittance at closed shutter. Values of 90 to 100 percent transmittance indicate no coating failure while decreasing readings are obtained as greater coating failure occurs.

The following wet rub resistance values are obtained:

| Polymer in Binder | % Transmittance |
|---|---|
| A | 92 |
| B | 95 |
| C | 95 |
| D | 97 |
| E | 95 |
| Butadiene copolymer | 6 |

6. Emulsion polymers are prepared having the following compositions:

A. 70 percent ethyl acrylate/24 percent methyl acrylate/6 percent isopropyl oxazolidinylethyl methacrylate.

B. 95 percent ethyl acrylate/5 percent β-aminoethyl vinyl ether.

C. 85 percent ethyl acrylate/10 percent methyl methacrylate/5 percent N-(monoethylaminoethyl)methacrylamide.

D. 97 percent ethyl acrylate/3 percent βaminoethyl vinyl sulfide.

E. 60 percent butyl acrylate/37 percent methyl methacrylate/3 percent aminoethoxyethyl acrylate.

F. 57 percent butadiene/37 percent styrene/6 percent oxazolidinylethyl methacrylate.

The above polymers are formulated and tested as given in Procedure (5). Twenty-four hours after coating, the following wet rub resistance values are obtained:

| Polymer in Binder | % Transmittance |
|---|---|
| A | 97 |
| B | 90 |
| C | 95 |

We claim

1. A coating composition adapted to coat papers consisting essentially of an aqueous dispersion of (1) a finely divided pigmentary material comprising a predominant proportion of a clay therein and (2) a binder, in an amount of 8 weight percent to 25 weight percent based on the pigment weight, consisting essentially of a mixture of (a) an amylaceous substance and at least 20 weight percent, based on the total binder weight, of (b) an emulsion copolymer of 1 to 30 percent by weight of units containing a primary, secondary, or tertiary amine group therein and at least one other copolymerizable monoethylenically unsaturated monomer selected from the group consisting of acrylic acid esters and methacrylic acid esters with alcohols having one to 18 carbon atoms, styrene, vinyltoluene, vinyl acetate, vinyl chloride, vinylidene chloride, butadiene, ethylene; the nitriles and amides of acrylic and of methacrylic acid; acrylic acid, methacrylic acid, itaconic acid, monomethyl itaconate, monoethyl itaconate, and (c) optionally another binder material, in an amount less than 30 percent by weight of the amount of (b), selected from other vinyl addition emulsion polymers, urea/formaldehyde condensates, melamine/formaldehyde condensates, proteinaceous materials, water-soluble or -dispersible linear polyester resins or cellulose ethers.

2. A composition as defined in claim 1 wherein the copolymer contains copolymerized therein an aminoalkyl vinyl ether or sulfide.

3. A composition as defined in claim 1 wherein the copolymer contains copolymerized therein an aminoalkyl acrylate or methacrylate.

4. A composition as defined in claim 1 wherein the copolymer contains copolymerized therein an oxazolidine of the formula

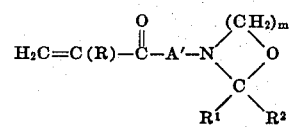

wherein m is an integer having a value of 2 to 3,

R', when not directly joined to R², is selected from the group consisting of hydrogen, phenyl, benzyl, and ($C_1$-$C_{12}$) alkyl groups, R², when not directly joined to R', is selected from the group consisting of hydrogen and ($C_1$-$C_4$) alkyl groups, R' and R², when directly joined together, form a 5- to 6-carbon ring with the attached carbon atom of the ring in the formula, i.e., R' and R², when joined together, are selected from the group consisting of pentamethylene and tetramethylene, and A' is —O($CH_2$)$_m$— or (O-alkylene)$_n$- in which (O-alkylene)$_n$ is a poly(oxyalkylene) group, having a molecular weight in the range from 88 to 348, in which the individual alkylene radicals are the same or different and are either ethylene or propylene.

5. A composition as defined in claim 1 wherein the copolymer contains copolymerized therein a compound of one of the following formulas:
0020

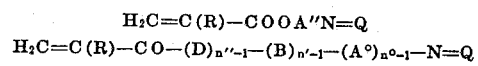

wherein

R is H or $CH_3$,

Q is selected from the group consisting of

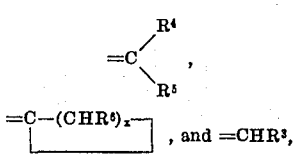

$R^6$ is H or it may be methyl in one $CHR^6$ unit,
$R^4$ is selected from the group consisting of $(C_1-C_{12})$-alkyl and cyclohexyl groups,
$R^5$ is selected from the group consisting of $(C_1-C_{12})$-alkyl and cyclohexyl groups,
$R^3$ is selected from the group consisting of phenyl, halophenyl, $(C_1-C_{12})$alkyl, cyclohexyl, and $(C_1-C_4)$alkoxyphenyl groups,
$A''$ is a $(C_2-C_{12})$ alkylene group,
$A°$, B and D are the same or different oxyalkylene groups having the formula $-OCH(R^7)-CH(R^7)-$ wherein $R^7$ is H, $CH_3$ or $C_2H_5$,
$x$ is an integer having a value of 4 to 5,
$n°$ is an integer having a value of 1 to 200,
$n'$ is an integer having a value of 1 to 200, and
$n''$ is an integer having a value of 1 to 200, the sum of $n°-1$, $n'-1$ and $n''-1$ having a value of 2 to 200.

6. A composition as defined in claim 1 wherein the copolymer is a copolymer of at least one ester of acrylic acid or methacrylic acid and an amine-containing monomer.

7. A composition as defined in claim 1 wherein the copolymer is a copolymer of acrylonitrile, at least one ester of acrylic acid or methacrylic acid and an amine-containing monomer.

8. A composition as defined in claim 1 wherein the copolymer is a copolymer of styrene, at least one ester of acrylic acid or methacrylic acid and an amine-containing monomer.

9. A composition as defined in claim 1 wherein the copolymer is a copolymer of butadiene, styrene and an amine-containing monomer.

10. A composition as defined in claim 1 wherein the amylaceous substance is an enzyme-converted starch.

11. A composition as defined in claim 10 wherein the binder contains only components (a) and (b).

12. A composition as defined in claim 4 wherein the copolymer is a copolymer of at least one ester of acrylic acid or methacrylic acid and the oxazolidine.

13. A composition as defined in claim 1 wherein the component (c) is present in an amount less than 30 weight percent of the amount of (b).

14. A mineral-coated paper product in which a paper sheet carries on a surface thereof a coating formed of a dried deposit of a coating composition as defined in claim 1.

15. A mineral-coated paper product in which a paper sheet carries on a surface thereof a coating formed of a dried deposit of a coating composition as defined in claim 6.

* * * * *

UNITED STATES PATENT OFFICE
CERTIFICATE OF CORRECTION

Patent No. 3,671,472      Dated June 20, 1972

Inventor(s) Raymond W. McNamee, Lubomir Mlynar, Norman Shachat

It is certified that error appears in the above-identified patent and that said Letters Patent are hereby corrected as shown below:

Line 20, of Col. 3 should read as follows:

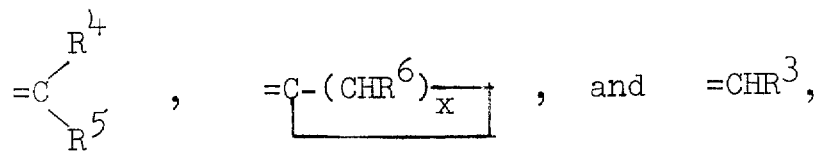

In line 37 of col. 7, "600 $\mu$" should read "600 m$\mu$".

In line 68 of col. 8, omit "0200".

Correct the spelling of the inventor's name on the covering page to "Norman Shachat".

Signed and sealed this 31st day of October 1972.

(SEAL)
Attest:

EDWARD M. FLETCHER, JR.　　　　　　　　ROBERT GOTTSCHALK
Attesting Officer　　　　　　　　　　　　Commissioner of Patents